June 5, 1962  E. W. WAGNER ETAL  3,037,379
SCORE LINE TESTING METHOD AND APPARATUS
Filed Sept. 9, 1957  4 Sheets-Sheet 2
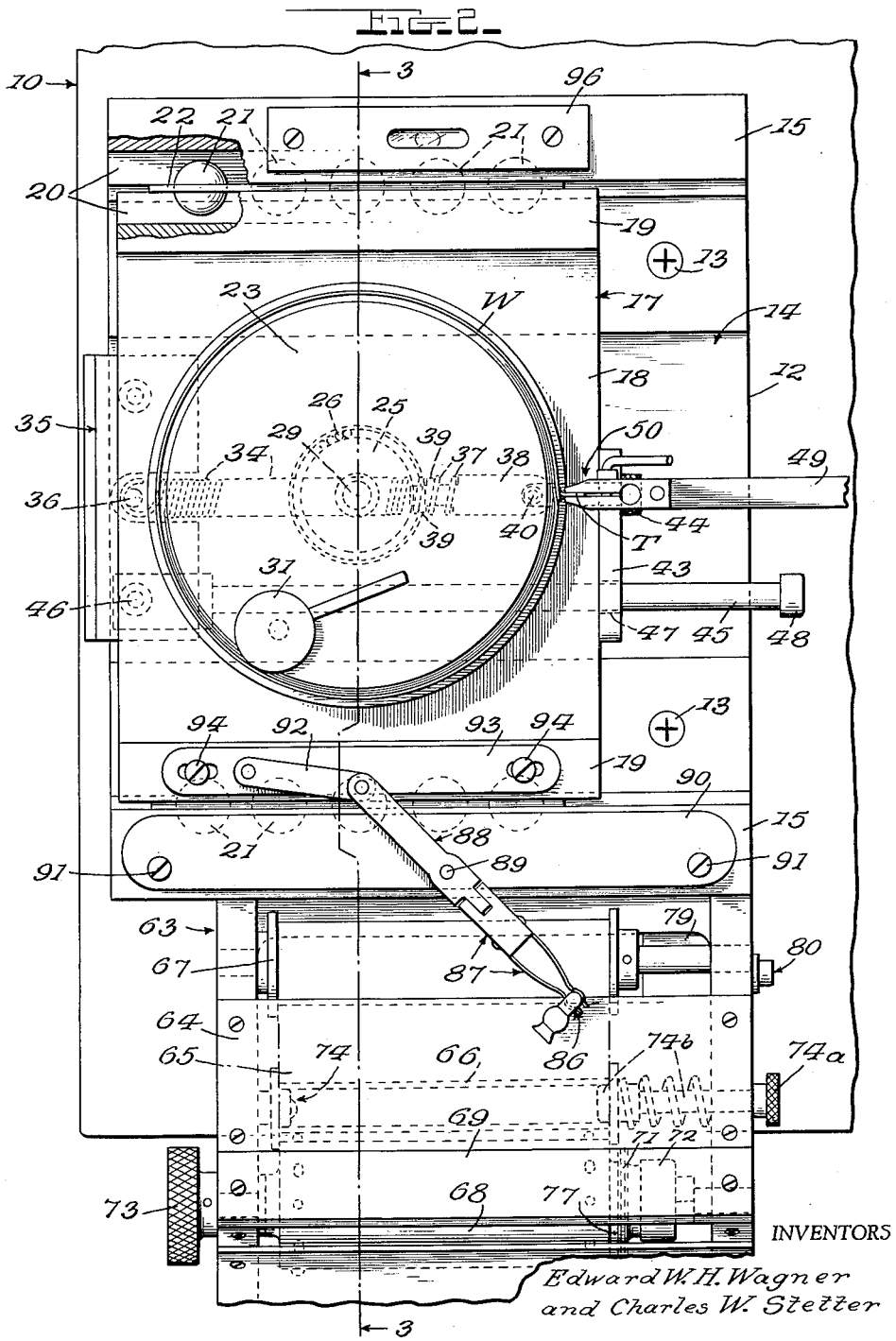
INVENTORS
Edward W. H. Wagner
and Charles W. Stetter
BY
Mason, Porter, Diller & Stewart
ATTORNEYS June 5, 1962    E. W. WAGNER ETAL    3,037,379
SCORE LINE TESTING METHOD AND APPARATUS
Filed Sept. 9, 1957    4 Sheets-Sheet 3
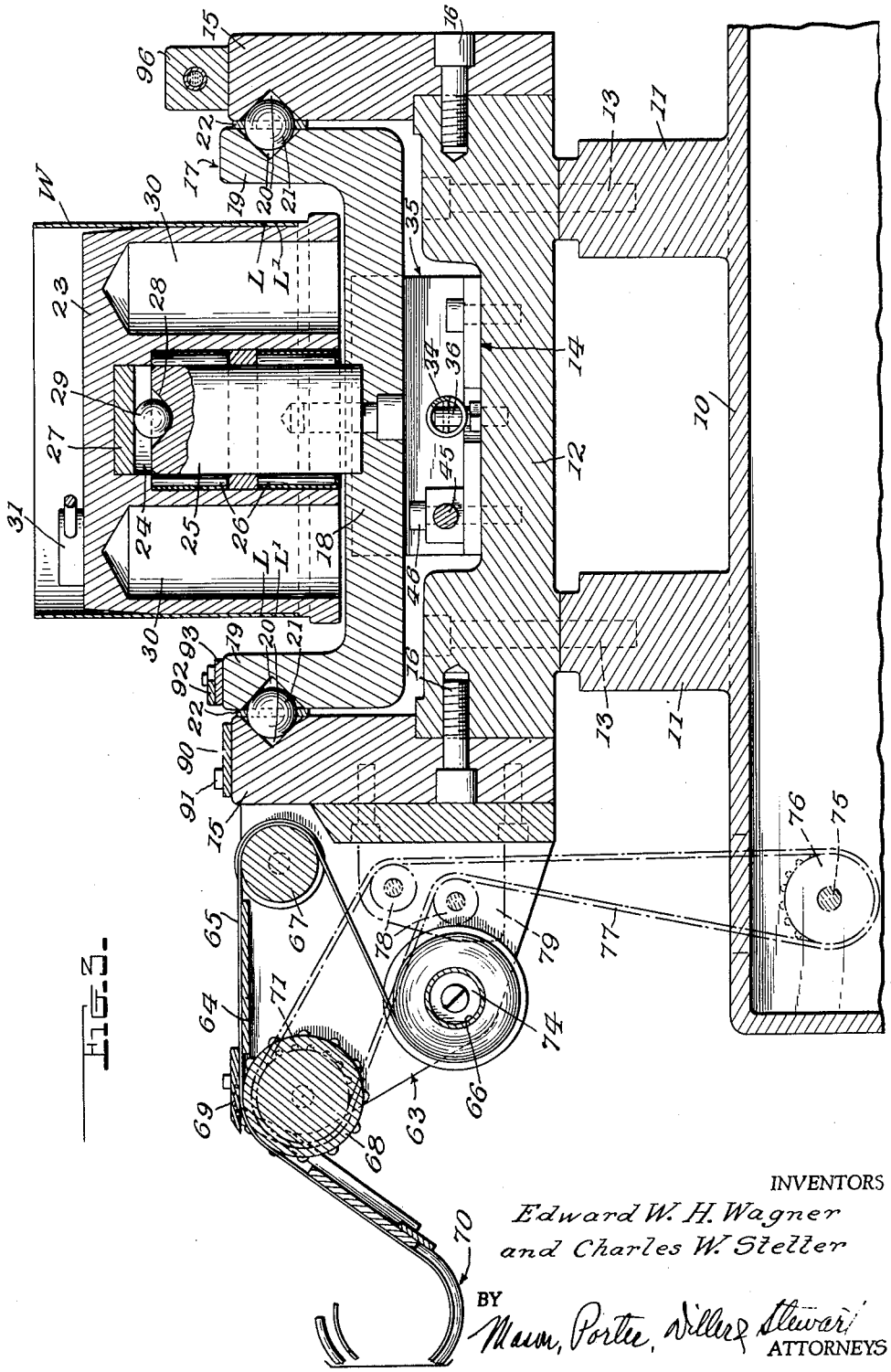
INVENTORS
Edward W. H. Wagner
and Charles W. Steller
BY
Mason, Porter, Diller & Stewart
ATTORNEYS June 5, 1962     E. W. WAGNER ETAL     3,037,379
SCORE LINE TESTING METHOD AND APPARATUS
Filed Sept. 9, 1957     4 Sheets-Sheet 4
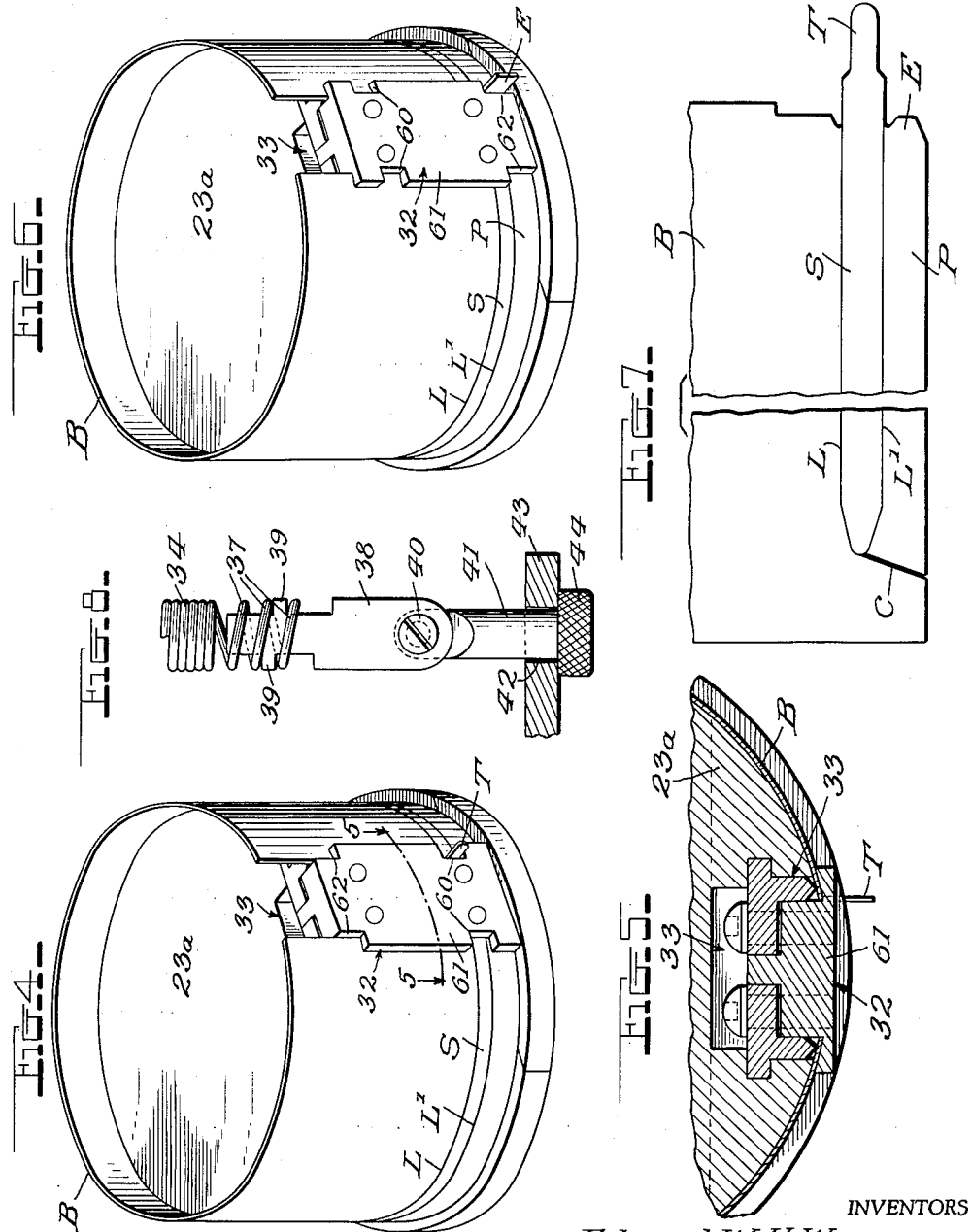
INVENTORS
Edward W. H. Wagner
and Charles W. Stetter
BY
ATTORNEYS

United States Patent Office 3,037,379
Patented June 5, 1962

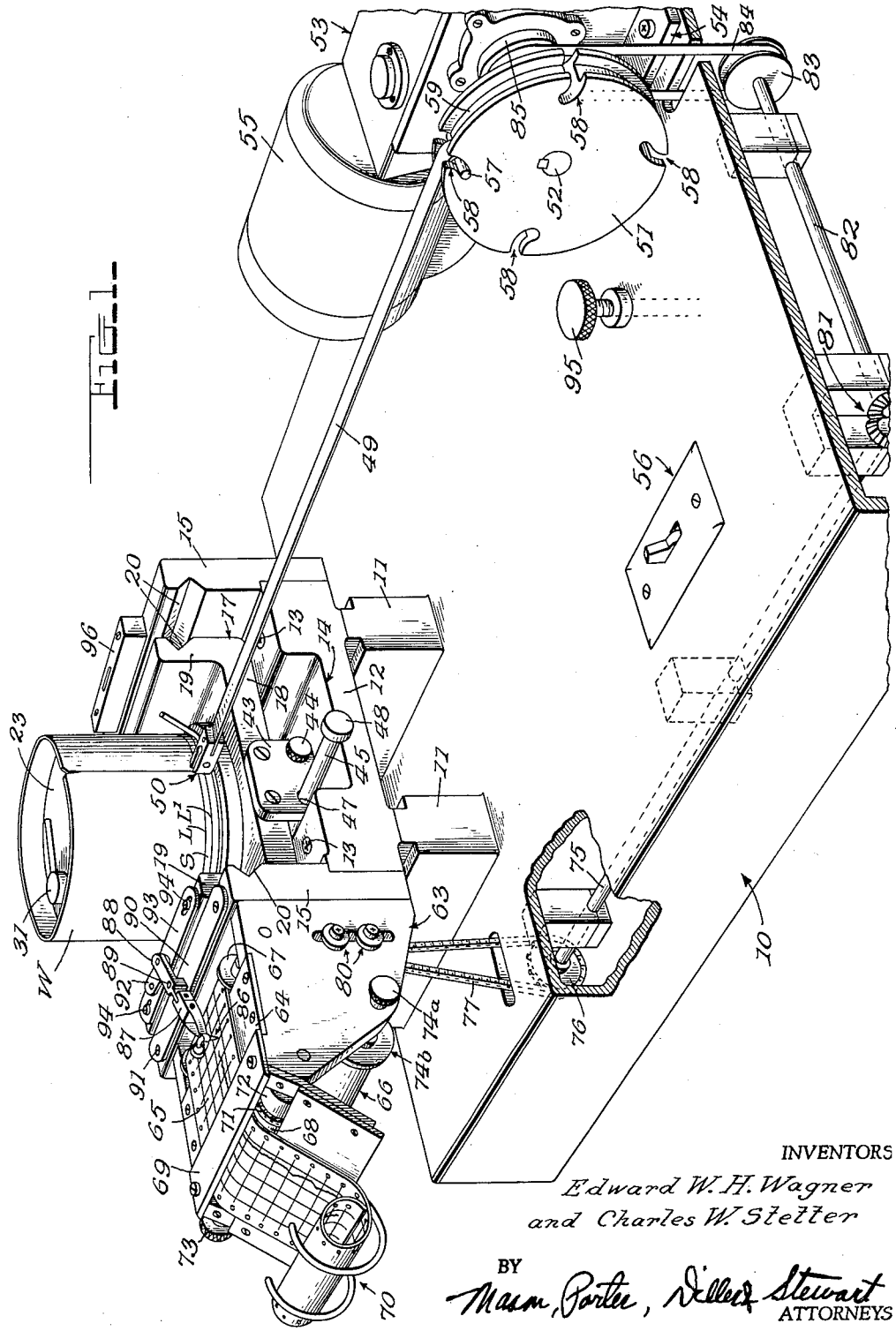

3,037,379
SCORE LINE TESTING METHOD
AND APPARATUS
Edward W. Wagner, Maywood, and Charles W. Stetter, Paterson, N.J., assignors to Continental Can Company, Inc., New York, N.Y., a corporation of New York
Filed Sept. 9, 1957, Ser. No. 682,881
6 Claims. (Cl. 73—96)

Various sizes and shapes of key-opened cans are provided with a tear strip between two score lines to be torn off by means of a key to effect can opening. The score lines are formed in the can body blanks by feeding these blanks between a scoring roll and an anvil roll and under ideal conditions the depth of score remains substantially uniform for some time during operation of the scoring machine. However, it is impossible to maintain such ideal conditions indefinitely. Initially, the scoring roll is adjusted as accurately as possible into the desired spaced relation with the anvil roll but the spacing gradually increases as the cutting edges of the scoring roll become more and more dulled. Also, slight nicking of the cutting edges and build-up of minute projections on the anvil roll frequently occur, all of which, if not promptly corrected, contribute toward the production of more or less defective cans. Therefore, spot tests must be performed on the scored blanks but the industry has heretofore lacked inspection procedure and apparatus free from the possibility of human error. It is to supply this need that the present invention has been provided.

The invention may be utilized to test either or both score lines of a blank, or either or both score lines of a complete can wall formed from such a blank: and as a generic term applicable to either the blank or the complete wall, "can wall element" will be employed.

One object of the invention has been to provide a novel testing method comprising the steps of mounting a can wall element having a score line, tearing off a portion of said element along said score line, and utilizing the tear resistance of said score line to disclose variances in the strength thereof.

Another object has been to disclose variances in the score line strength by recording such variances upon a recording sheet.

Yet another object has been to provide a novel testing method for simultaneously testing both score lines of a can wall element and disclosing the results of the test, this test being primarily to determine the ease or lack of ease with which the tear strip between the two score lines may be torn off.

A further object has been to provide a novel, accurate and rapid apparatus for testing the score lines and disclosing, preferably by recording, the tear resistance thereof.

A movable support is provided upon which to mount a can wall element to be tested: and this support is mounted for to and fro movement. Yieldable means is connected to the movable support and yieldably biases it toward a normal position. A pull member is provided having means for connecting it with a portion of the can wall element to be torn off along a score line or lines thereof: and operating means is provided for moving said pull member in a direction tending to move said movable support away from the aforesaid normal position. Thus the desired portion of the can wall element will be torn off and fluctuations of the movable support will be caused by differences in the tear resistance of the score line or lines being tested. Indicating means, preferably recording means, is connected with the movable support and is actuated by the fluctuations thereof. Thus, the tear resistance of the score line or lines being tested is accurately disclosed.

Another object has been to provide the movable support with a rotatably mounted mandrel to be surrounded by the can wall element and adapted to rotate under the influence of the pull of the aforesaid pull member upon the portion of said can wall member being torn off, thereby making it possible to exert the pull at a uniform angle to said can wall element, for best results.

Still another object has been to provide the aforesaid pull member in the form of an elongated flexible element having a clamp at one end for connecting it with the portion of the can wall element to be torn off, and to provide a driven wheel to which the other end of said flexible element is connected to be wound on said wheel, whereby a uniform pull is always exerted.

Yet another object is to embody a record sheet feed roll in the recording means and to provide driving connections from the operating means of the aforesaid pull member to said feed roll, for driving the latter and feeding the record sheet synchronously with the tearing off of the desired portion of the can wall element.

A further object has been to provide a clamp for connecting the ends of a body blank to be tested, when said blank is bent into substantially the shape it would have in a completed can, and to provide a mandrel recessed to receive a portion of said clamp when the bent blank is placed around said mandrel.

A still further object has been to provide the blank end clamp of such form that it may be used in one position when testing either score line of a pair and may be used in an inverted position when simultaneously testing both score lines.

Yet another object has been to provide a simple and effective construction which may be expeditiously manufactured by conventional machine shop operations.

With the above and other objects in view that will hereinafter appear, the nature of the invention will be more clearly understood by reference to the following detailed description, the appended claims and the several views illustrated in the accompanying drawings.

In the drawings:

FIGURE 1 is a perspective view of the apparatus in readiness for use in testing both score lines of a completed can wall body.

FIGURE 2 is an enlarged top plan view of the left end of the apparatus, partly broken away and in section.

FIGURE 3 is a vertical transverse sectional view on line 3—3 of FIGURE 2.

FIGURE 4 is a perspective view showing the mandrel and clamp engaged with the ends of a pre-bent body blank, in readiness for testing both score lines of said blank.

FIGURE 5 is an enlarged horizontal sectional view on line 5—5 of FIGURE 4.

FIGURE 6 is a similar view showing the clamp positioned in readiness for testing only one of the score lines.

FIGURE 7 is a fragmentary elevation showing the manner in which one form of blank may be cut prior to testing.

FIGURE 8 is a fragmentary top view, partly in section, showing the adjustment for the spring which biases the movable support toward normal position.

The construction disclosed in the drawings is preferred and while that construction will be rather specifically described, it is to be understood that variations may well be made.

A hollow, elongated, horizontal base 10 (FIGURES 1 to 3) is provided, said base having two longitudinal lugs 11 on the upper side of its rear end portion. Upon these lugs, a horizontal plate 12 is secured by screws 13, the upper side of said plate having a channel 14. Two vertical walls 15 are secured by screws 16 to opposite edges of the plate 12, said walls projecting upwardly from said plate 12 and being disposed in parallel planes extending longitudinally of the base 10. The walls 15 and plate 12 jointly form a guideway in which a carriage 17 is mounted for to and fro movements.

The carriage 17 comprises a horizontal plate 18 and two side walls 19 integral with said plate and disposed at the inner sides of the above mentioned walls 15. The adjacent sides of the two pairs of walls 15 and 19 are formed with longitudinal grooves 20 which receive bearing balls 21 to mount the carriage 17 for movement with only negligible frictional resistance. The balls 21 are held in spaced relation by suitable retainers 22.

A mandrel 23 (FIGURES 1 to 3) is provided to mount a complete can wall W, to be tested, upon the carriage 17: and a second mandrel 23a (FIGURES 4 to 6) is provided for use in place of said mandrel 23 when a body blank B is to be tested. Either mandrel 23 or 23a is rotatably mounted on the carriage in the manner shown in FIGURE 3. The mandrel is formed with a downwardly open bearing socket 24 to receive a bearing stub 25 with which the carriage 17 is provided, and suitable roller bearings 26 are associated with said socket 24 and stub 25. The closed upper end of the socket 24 is equipped with a thrust plate 27 and the upper end of the stub 25 is formed with a socket 28 which receives a thrust ball 29 upon which said plate 27 rests. The openings 30 are solely for the purpose of reducing the weight of the mandrel.

The mandrel 23 (FIGURES 1 to 3) is of a size to frictionally receive a complete can wall W and may, if desired, be provided with a manually operable cam 31 to be turned into tight contact with the inner side of said wall. The mandrel 23a (FIGURES 4 to 6) is of a size to frictionally receive the blank B when this blank is bent into proper shape and connected at its ends by a clamp 32 preferably constructed as shown. The mandrel 23a has a peripheral recess 33 to receive a portion of the clamp 32.

A coiled tension spring 34 (FIGURES 2, 3 and 8) is provided to yieldably bias the carriage 17 toward a rear normal position: and a stop 35 is secured to the rear end of the plate 12 in position to limit the rearward movement of said carriage under the influence of said spring. The rear end of the spring 34 is anchored at 36 to the plate 12: and the front end of said spring is adjustably connected with the carriage 17. The adjustable connection is preferably of the form shown in FIGURE 8.

Several of the front end convolutions 37 of the spring 34 are widely separated and one end of a plate 38 is received in these convolutions, said plate having lateral lugs 39 between said convolutions. The other end of the plate 38 is secured at 40 to a stem 41 which extends rotatably through an opening 42 in a plate 43 secured to the front end of the carriage 17. The front end of the stem 41 has a knob 44 abutting the front side of the plate 43. By turning this knob 44 the lugged rear end of the plate 38 "threads" inwardly or outwardly with respect to the spring 34 and the tension of this spring may therefore be adjusted.

The above described adjustable connection between the spring 34 and the carriage 17 is substantially identical with a known connection heretofore used in weighing scales and is shown only as the preferred connection.

A stop rod 45 is provided to prevent excessive forward movement of the carriage 17. The rear end of the rod 45 is anchored at 46 to the plate 12. The front end portion of the rod extends slidably through an opening 47 in the plate 43 and is formed with a stop bead 48 to be struck by said plate 43. Both the rod 45 and the spring 34 are under the bottom plate 18 of the carriage 17 and are received in the channel 14 of the underlying fixed plate 12.

A pull tape 49 (FIGURES 1 and 2) is provided for tearing off a desired portion of the mounted can wall W or blank B along a score line or lines thereof. The rear end of this pull tape has a clamp 50 for connecting it with the wall or blank portion to be torn off. The front end of the tape 49 is connectable with a wheel 51 (FIGURE 1) for winding said tape to tear off the desired portion of the can wall element W or B to test the strength of one or both of the score lines. The pull of the tape 49 and the yieldable resistance of the spring 34 cause to and from movements of the carriage 17 according to variances in the tear resistance of the score line or lines being tested and these fluctuations of the carriage are utilized to actuate a recording means hereinafter described.

The wheel 51 is secured on the output shaft 52 of a reduction gear unit 53 which is mounted at 54 upon the base 10, said gear unit 53 being driven by an electric motor 55. The switch 56 for this motor is preferably mounted on the base 10.

For connecting the tape 49 with the wheel 51, the front end of said tape is provided with a transverse pin 57 receivable in any of circumferentially spaced notches 58 formed in said wheel. This wheel has a peripheral groove 59 to receive the tape, and the circumference of the inner wall of said groove is determined by the speed of the motor 55. The relation of the wall circumference and the motor speed results in a tearing of the metal along the score or scores at approximately the same speed at which a customer would tear off the tear strip when using the customary key provided with the can. As the tape is wound on the wheel and thus tears off the desired portion of the can wall element, the mandrel 23 or 23a rotates on the carriage 17, under the influence of the pull, insuring that the line of pull shall always be at a uniform angle to said wall element.

In FIGURES 1 and 2, the tape clamp 50 is engaged with the usual key tab T of the customary tear strip S between the score lines L and L': and upon driving of the wheel 51 said strip S will be torn off and the combined tear resistance of both tear lines L and L' will thus be tested. This same result will be obtained when the bent and clamped blank B of FIGURE 4 is being tested after first mounting the mandrel 23a upon the carriage 17 in place of the mandrel 23. Notches 60 in the outer member 61 of the clamp 32 then clear both of the score lines L and L'.

If the outermost score line L' is to be individually tested (see FIGURE 6) the key tab of the tear strip S is cut off, the end E of the blank portion P is bent outwardly to be engaged by the clamp 50, and the clamp 32 is used in the inverted position shown in FIGURE 6. Notches 62 in the outer clamp member 61 then clear the blank portion P and the latter will be torn off along the outer score line L' during performance of the testing operation. By so applying the clamp 32 that the notches 62 will clear both of the score lines L and L' and the tear strip S and the blank portion P, both this portion P and the tear strip S may be simultaneously torn off along the innermost score line L to individually test the latter.

When either score line of a blank such as that shown in FIGURE 7 is to be individually tested it is preferable to form the cut C in the blank as shown, permitting complete tearing off of the portion P along the outer score line L' or complete simultaneous tearing off of the portions P and S along the inner score line L.

The results of all tests are recorded by the recording means now to be explained.

A bracket 63 (FIGURES 1 to 3) is secured to and projects laterally from one of the guideway walls 15. This bracket 63 carries a fixed supporting plate 64 to support a record sheet 65 as the latter is fed from a supply roll 66 over a guide roll 67 and a feed roll 68, said rolls being suitably mounted on said bracket 63. This bracket also carries a fixed knife 69 to facilitate tearing off of the record sheet after each test, if desired. A receiver 70 is also provided, however, in which the record sheet may be allowed to curl into rolled form, if desired.

A drive sprocket 71 (FIGURES 1 to 3) is connected by a friction clutch 72 with the feed roll 68: and a knob 73 is provided to rotate said feed roll independently of said sprocket when required. The additional knob shown at 74a in FIGURES 1 and 2 is simply a pull-out knob on a spring-pressed support 74b for one end of the supply roll 66, the other end of said supply roll being removably supported at 74, permitting mounting and demounting of said supply roll 66: turning of the knob will effect manual rotation of said supply roll.

A longitudinal shaft 75 is mounted in the base 10 and has a sprocket 76 at one end connected by a chain 77 with the sprocket 71 of the feed roll 68. This chain passes around suitable idlers 78 (FIGURE 3) carried by a block 79 which is adjustably mounted at 80 (FIGURE 1) on the bracket 63.

The shaft 75 is gear-connected at 81 (FIGURE 1) with a transverse shaft 82 within the base 10. This shaft is provided with a pulley 83 which is connected by a belt 84 with a pulley 85 on the output shaft 52 of the gear unit 53. The feed roll 68 is thus driven synchronously with the wheel 51 which operates the pull tape 49.

A recording pen 86 is provided to form a graph line on the record sheet 65. This pen is carried by a vertically swingable outer end portion 87 of an arm 88 which is pivoted at 89 to a base 90 secured at 91 upon one of the guideway walls 15. The inner end of the arm 88 is link-connected at 92 with a base 93 which is adjustably mounted at 94 on one of the carriage walls 19. Thus, the to and fro movements of the carriage 17, caused by varying tear resistance of the score line or lines being tested, are transmitted to the recording pen 86 which records the result of the test upon the record sheet 65.

In order to prevent gravity pull in either direction on the carriage 17, a leveling screw 95 and a level 96 are provided for leveling the base 10.

*Operation*

The can wall element to be tested is engaged with the proper mandrel 23 or 23a. The tape clamp 50 is then engaged with the portion of the can wall element to be torn off and the tape 49 is connected with the wheel 51. This wheel is then driven to cause the tape to pull upon the portion of the can wall element to be torn off along a score line or lines. The initial pull causes the carriage 17 to leave its normal position against the resistance of the spring 34. Whenever, the tear resistance of the score line or lines increases, the carriage 17 is moved further from normal position by the pull exerted by the tape 49. Whenever the tear resistance decreases, the spring 34 moves the carriage back toward normal position. Thus, variances in the tear resistance of the score line or lines being tested, cause to and fro movements of the carriage 17. These carriage fluctuations are transmitted to the arm 88 and the pen 86 is therefore moved upon the travelling record sheet 65 to record the results of the test by forming a graph line on said record sheet. This graph line discloses whether the scoring rolls are functioning properly or have become dulled or nicked and also shows whether any projections have built-up on the anvil roll: and any disclosed defects in the scoring machine may be corrected.

From the foregoing, it will be seen that novel and advantageous provision has been made for attaining the desired ends. However, attention is again invited to the possibility of making variations within the scope of the invention.

We claim:

1. A score line testing apparatus comprising a base, a horizontal guideway secured upon said base, a carriage engaged with said guideway for to and fro movements, spring means connected to said carriage for biasing it in one direction, a wheel spaced in the other direction from said carriage, a mandrel to be surrounded by a can wall element, means mounting said mandrel upon said carriage for free rotation, an elongated flexible pull member connected at one end to said wheel, the other end of said flexible pull member being provided with a clamp for connecting it with a portion of the can wall element for tearing off a circumferential portion of the latter along a score line or lines thereof when said wheel is rotated to wind said flexible pull member, means mounting said wheel on said base, driving means connected with said wheel, and means actuated by to and fro movements of said carriage for disclosing variances in the strength of the score line or lines being tested.

2. A score line testing apparatus comprising a base, a horizontal guideway secured upon said base, a carriage engaged with said guideway for to and fro movements, spring means connected to said carriage for biasing it in one direction, a wheel spaced in the other direction from said carriage, a mandrel to be surrounded by a can wall element, means mounting said mandrel upon said carriage for free rotation, an elongated flexible pull member connected at one end to said wheel, the other end of said flexible pull member being provided with a clamp for connecting it with a portion of the can wall element for tearing off a circumferential portion of the latter along a score line or lines thereof when said wheel is rotated to wind said flexible pull member, means mounting said wheel on said base, driving means connected with said wheel, a bracket secured to and projecting laterally from the aforesaid guideway, a record sheet support carried by said bracket, means for feeding a record sheet over said support and including a feed roll carried by said bracket, recording means for forming a graph line on the record sheet, means connecting said recording means with said carriage for moving the former in accordance with movements of the latter, and driving connections from the aforesaid wheel driving means to said feed roll.

3. In a testing apparatus, a mandrel to be surrounded by a pre-bent blank to be tested, and a clamp for connecting the ends of the bent blank, said mandrel having a peripheral recess to receive a portion of said clamp, said mandrel having bearing means instrumental in rotatably mounting said mandrel, said clamp including an outer member to contact with the outer periphery of the bent blank, said outer member being notched to clear a score line of the blank.

4. In a testing apparatus, a mandrel to be surrounded by a pre-bent blank to be tested, and a clamp for connecting the ends of the bent blank, said mandrel having a peripheral recess to receive a portion of said clamp, said mandrel having bearing means instrumental in rotatably mounting said mandrel, said clamp including an outer member to contact with the outer periphery of the bent blank, said outer member being notched to clear one of a pair of parallel score lines of the blank when the clamp is used in one position, said outer member being additionally notched to clear both of the score lines of a blank when said clamp is used in an inverted position.

5. In a testing apparatus, a mandrel to be surrounded by a pre-bent blank to be tested, and a clamp for connecting the ends of the bent blank, said mandrel having a peripheral recess to receive a portion of said clamp, said mandrel having bearing means instrumental in rotatably mounting said mandrel, said clamp including a generally T-shaped base portion presenting a pair of spaced aligned flanges and a pair of clamp elements cooperating with said flanges for clampingly engaging the ends of the bent blank.

6. A score line testing apparatus comprising a base, a carriage, means mounting said carriage on said base for to and fro movements, spring means connected to said carriage for biasing said carriage in one direction, a mandrel to be surrounded by a can wall element, means mounting said mandrel on said carriage for free rotation, an elongated flexible pull member, one end of said pull member having a clamp for connecting said pull member with a portion of the can wall element for tearing off a circumferential portion of the can element along a score line thereof, tensioning means carried by said base in alignment with the direction of movement of said carriage and engaged with said pull member to move said pull member away from said carriage with said pull member moving at a constant rate, a bracket secured to said base adjacent said carriage and projecting laterally from said base relative to the direction of movement of said carriage, a record sheet support carried by said bracket, means for feeding a record sheet over said support and including a feed roll carried by said bracket, recording means for forming a graph line on the record sheet, means connecting said recording means with said carriage for moving the former in accordance with movements of the latter, and driving connections from the aforesaid tensioning means to positively drive said feed roll.

References Cited in the file of this patent
UNITED STATES PATENTS

| | | |
|---|---|---|
| 1,273,972 | Wood | July 30, 1918 |
| 1,766,741 | Butters | June 24, 1930 |
| 2,365,014 | Silverman et al. | Dec. 12, 1944 |
| 2,390,510 | Chatten | Dec. 11, 1945 |
| 2,473,517 | Freedman | June 21, 1949 |
| 2,561,133 | Petkewicz | July 17, 1951 |
| 2,834,205 | Pickup | May 13, 1958 |